(12) United States Patent
Widgery

(10) Patent No.: US 11,618,418 B2
(45) Date of Patent: Apr. 4, 2023

(54) LIGHTWEIGHT WHEEL CHOCK

(71) Applicant: CHECKERS INDUSTRIAL PRODUCTS, LLC, Broomfield, CO (US)

(72) Inventor: Greg Widgery, Broomfield, CO (US)

(73) Assignee: CHECKERS INDUSTRIAL PRODUCTS, LLC, Broomfield, CO (US)

( * ) Notice: Subject to any disclaimer, the term of this patent is extended or adjusted under 35 U.S.C. 154(b) by 352 days.

(21) Appl. No.: 16/706,293

(22) Filed: Dec. 6, 2019

(65) Prior Publication Data
US 2021/0170997 A1    Jun. 10, 2021

(51) Int. Cl.
*B60T 3/00* (2006.01)

(52) U.S. Cl.
CPC ........................... *B60T 3/00* (2013.01)

(58) Field of Classification Search
CPC ................................. B60T 3/00; B64F 1/16
USPC ................................................ 188/4 R, 36
See application file for complete search history.

(56) References Cited

U.S. PATENT DOCUMENTS

| | | |
|---|---|---|
| 2,797,774 A | 7/1957 | Richard |
| 2,848,070 A | 8/1958 | Wilson |
| 3,189,127 A | 6/1965 | Karnow et al. |
| 3,265,159 A | 8/1966 | Worden |
| D215,325 S | 9/1969 | Joseph |
| 3,664,466 A | 5/1972 | Rotheiser |
| 3,800,917 A | 4/1974 | Vick |
| 3,819,138 A | 6/1974 | Rehkopf et al. |
| D235,332 S | 6/1975 | Vincent et al. |
| 4,134,610 A | 1/1979 | Lindewall |
| 4,144,951 A | 3/1979 | Rea |
| 4,321,989 A | 3/1982 | Meinzer |
| 4,781,271 A * | 11/1988 | Wokeck ............... B60T 3/00 521/54 |
| 4,917,219 A | 4/1990 | Henry |
| D316,243 S | 4/1991 | Henry |
| D493,408 S | 7/2004 | Chrisco et al. |
| D531,568 S | 11/2006 | Davidian |
| D644,159 S | 8/2011 | Marcum |
| D656,881 S | 4/2012 | Beranek et al. |

(Continued)

FOREIGN PATENT DOCUMENTS

KR   20100009005 A  *  1/2010  ............... B60T 3/00

OTHER PUBLICATIONS

Machine translation of KR-20100009005 (no date).*

*Primary Examiner* — Nicholas J Lane
(74) *Attorney, Agent, or Firm* — Dorsey & Whitney LLP

(57) ABSTRACT

A wheel chock has a body with a shell and filled core construction capable of supporting high chocking loads while being relatively lightweight and portable. The chock includes walls sized and shaped to support large-diameter wheels such as wheels of large haul vehicles and mining trucks. The chock can be sized proportional to the radius of the wheel to be retained or based on the radius of curvature of a wall configured to primarily support the outer surface of the wheel. The chock can have a cut off or flattened toe or front surface that reduces weight and helps to ensure that the entire chock is load-bearing when in a chocking position. The chock can also have a flattened top surface to support the outer surface of a tire that deforms around the chock while it is being retained by the chock.

20 Claims, 6 Drawing Sheets

(56) References Cited

U.S. PATENT DOCUMENTS

| | | | |
|---|---|---|---|
| D656,882 S | 4/2012 | Beranek et al. | |
| D662,026 S | 6/2012 | Beranek et al. | |
| D673,106 S | 12/2012 | Rossman et al. | |
| 8,851,240 B1 * | 10/2014 | Scoggins | B60T 3/00 |
| | | | 188/32 |
| D855,005 S | 7/2019 | Delancey et al. | |
| D860,107 S | 9/2019 | Bilgin | |
| 11,046,298 B1 | 6/2021 | Desmarais et al. | |
| D926,104 S | 7/2021 | Nichols et al. | |
| D928,065 S | 8/2021 | McGugan et al. | |
| D936,557 S * | 11/2021 | Widgery | D12/217 |
| 2004/0040794 A1 * | 3/2004 | Bateman | B60T 3/00 |
| | | | 188/32 |

* cited by examiner

LIGHTWEIGHT WHEEL CHOCK

TECHNICAL FIELD

The present disclosure generally relates to wheel chocks for heavy industrial applications and specifically relates to a lightweight wheel chock for use with heavy industrial tractors, mining equipment, and related vehicles.

BACKGROUND

Wheel chocks are wedges of material placed closely against the wheels of a vehicle to prevent unintended movement or rotation of the wheels. More specifically, wheel chocks are used in combination with brakes (e.g., parking brakes) to prevent accidental movement of the vehicle when the vehicle is intended to remain stationary. Wheel chocks are often used in heavy industrial applications such as in mining, shipping, and construction in order to keep tractors, trucks, cranes, and other wheeled vehicles from moving when parked. These large vehicles can have weights of several hundred tons and wheels having diameters up to and even in excess of 10 feet. Therefore, such wheel chocks need to be robust in order to keep the vehicles reliably held in place. Users should also be able to conveniently move and remove the wheel chocks when needed. There is therefore a constant need for improvements in the field of wheel chocks.

SUMMARY

One aspect of the present disclosure relates to a wheel chock comprising a shell defining an inner cavity, and a core filling the inner cavity of the shell. The shell and the core can be configured to prevent rotation of a wheel when wedged between an outer surface of the wheel and a ground surface, wherein the shell and the core comprise a combined weight of up to 30 pounds.

In some embodiments, the shell comprises a first rigid material having a first density and the core comprises a second rigid material having a second density, with the second density being less than the first density. The core can comprise a rigid foam, and the shell can have a substantially constant wall thickness. The shell and the core can comprise a chocking payload of up to and even more than 650 tons, and can also be configured to prevent rotation on a ground surface having a grade of up to 10 percent.

In another aspect of the disclosure, a wheel chock is provided that comprises a shell defining an inner cavity, with the shell having a wedging wall configured to contact a wheel, a front wall to face a base of the wheel, and a rear wall to face away from the base of the wheel, and a rigid filling within the inner cavity of the shell. The wedging wall can distribute load through the front wall and through the rear wall when chocking the wheel against the wedging wall. The wheel chock can be configured to chock a wheel having a diameter greater than about 12 feet. The front wall can be substantially vertically-oriented and spaced away from the base of the wheel when the shell is in a chocking position. The wedging wall can comprise a top wall that is substantially horizontally-oriented and an angled wall adjoining the top wall. The top wall can be configured to contact a deformed portion of the wheel. The rear wall can be partially horizontally oriented and can also adjoin a bottom wall of the shell. The entire shell and rigid filling can be configured to be load-bearing when engaging a wheel in a chocking position.

Yet another aspect of the disclosure relates to a wheel chock comprising a shell having a base wall, a toe wall, a contact wall, a top wall, and a back wall, with the shell having an inner chamber, and a core material within the inner chamber of the shell. The contact wall can comprise a curved surface having a radius, with the radius having a center point and with the toe wall having a height greater than or equal to about eight percent of the radius of the curved surface.

In some embodiments, the toe wall can be vertically oriented and can adjoin the base wall. The back wall can be about twice as long as the toe wall. The shell and the core material can have a combined weight that is less than about 30 pounds.

The above summary of the present invention is not intended to describe each embodiment or every implementation of the present invention. The Figures and the detailed description that follow more particularly exemplify one or more preferred embodiments.

BRIEF DESCRIPTION OF THE DRAWINGS

The accompanying drawings and figures illustrate a number of exemplary embodiments and are part of the specification. Together with the present description, these drawings demonstrate and explain various principles of this disclosure. A further understanding of the nature and advantages of the present invention may be realized by reference to the following drawings. In the appended figures, similar components or features may have the same reference label.

Figure 1:
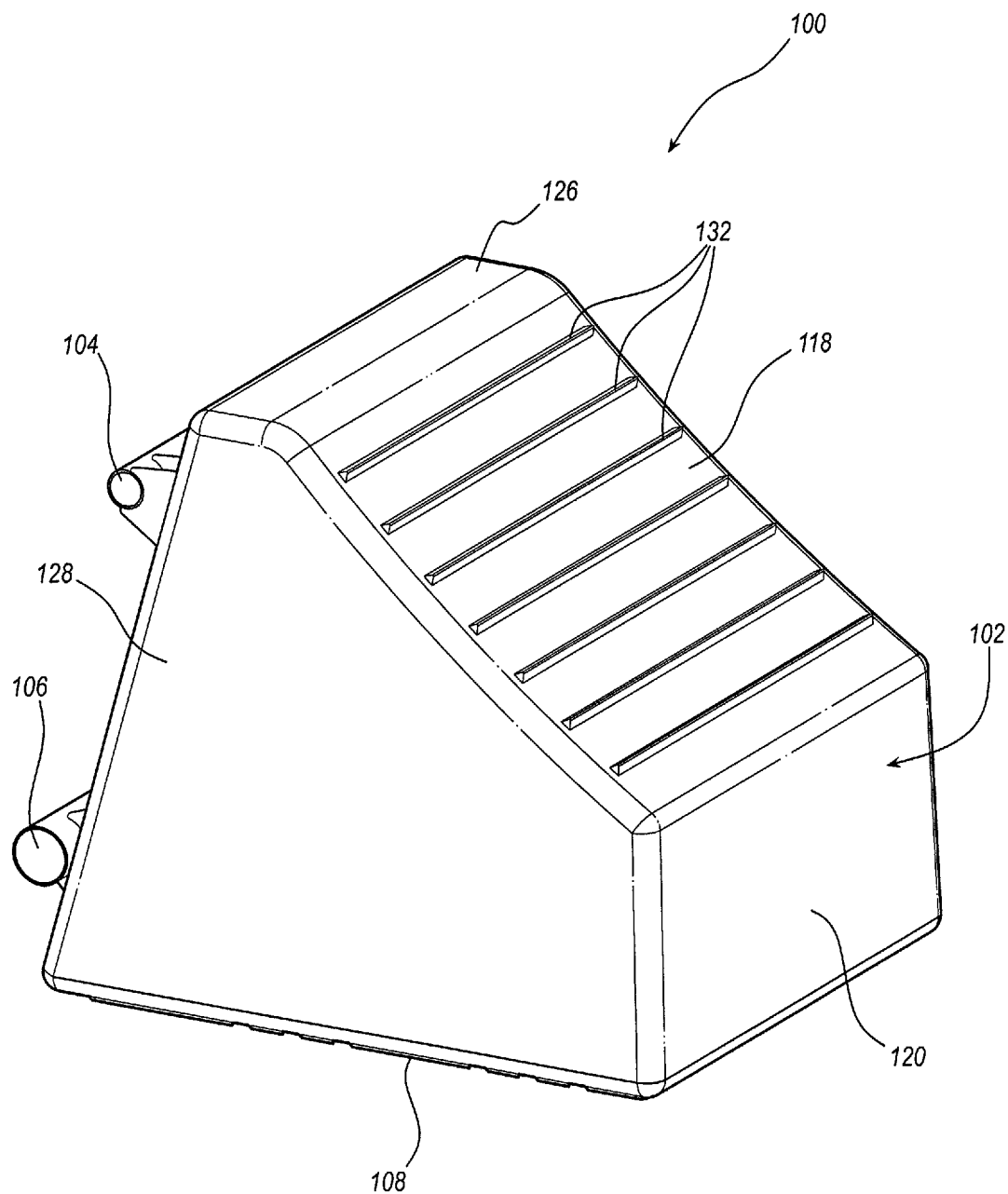
FIG. 1 is a perspective view of a wheel chock.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

Heavy industrial vehicle wheel chocks have historically been overly difficult to move and remove from the wheels of their vehicles. For some common vehicles, such as large tractors and trucks, the wheels have an about 14-foot diameter, and the vehicles can weigh up to and even more than 650 tons. Conventional wheel chocks designed to hold this immense size and weight have a large size and weight to ensure reliability. However, the large size and weight of the wheel chocks makes them difficult or impossible to move by a single person. For example, the U.S. Department of Health and Human Services recommends using a National Institute for Occupational Safety and Health lifting equation to determine a recommended weight limit for lifting objects such as wheel chocks in a workplace, wherein the limit is 30 pounds for a wheel chock moved by a single person. Accordingly, traditional wheel chocks that weigh more than 30 pounds require more than one person to place and remove a wheel chock, thereby doubling the man-hours and effort required to perform this basic operational procedure for the heavy equipment. This required additional expenditure of worker effort corresponds with increased costs to employers and inconveniences for workers.

Furthermore, although wheel chocks have been used in many applications and with various designs over time, conventional large industrial vehicle wheel chocks have generally been designed using principles that should only apply to smaller vehicles. For example, industrial wheel chocks have been traditionally designed with an undue amount of excess support material for wheels that have a 10- to 14-foot (or more) diameter. Large industrial vehicles also have tires with a relatively low amount of inflation pressure (e.g., about 10 pounds per square inch (PSI)) and are susceptible to flexing and deformation when in contact with a wheel chock, unlike smaller vehicles with much higher inflation pressure (e.g., 30 PSI or more) and much less deformation when engaging a bump or ramped surface like what is found on a typical wheel chock. Accordingly, conventional wheel chocks lack optimization in their designs and functions.

The present disclosure generally relates to lightweight wheel chocks designed for optimized retention of large industrial vehicle wheels. Wheel chocks can have a relatively thin and consistent-thickness exterior shell comprising a rigid, chemically-inert plastic or similar material and an interior cavity within the shell that is filled with lightweight rigid or semi-rigid material. The combined configuration of materials can be capable of retaining a 650-ton vehicle on a range of different grades (e.g., up to an about 10 percent grade) while weighing less than about 30 pounds. Therefore, embodiments of the wheel chocks described herein can be moved more easily and safely by a single person, can have reduced waste in their construction, can be more portable, can save storage space, and can be specially adapted for the needs of high-weight, large-wheeled vehicles and their challenging operating environments.

Wheel chocks, wedges, and blocks of the present disclosure may be suitable for use with large-scale mining trucks and other equipment used in strip mines and other mining applications using 650-ton-capacity mining haul vehicles. For this reason, a chock can be referred to as having a 650-ton "chocking capacity" or "wheeled vehicle retention capacity." Wheel chocks of the present disclosure can have a shape including a modified wedge that greatly reduces or eliminates wasted or unused material and weight in the chock. For example, the shape of the wheel chocks can be configured to reduce unused material by ensuring that the entire shell structure and core structure are load-bearing when fully wedged between a wheel and a ground surface. In other words, the entire shell and core of the wheel chock can be under pressure when bearing a wheel load. In conventional chocks, portions of the shell and core are non-load-bearing when under wheel pressure, either because they are overly large or they extend too far away from the outer surfaces of the wheel to take on significant load when in use.

Some embodiments of the wheel chock comprise a modified wedge shape having a front wall or toe wall configured to face the base of the wheel and that has a height equal to a significant portion of the overall height of the wedge shape. Thus, the wedge shape does not taper down to a point underneath the wheel but instead contacts less of the wheel surface than a conventional wedge shape. This modified wedge shape can bear an equal amount of load as a conventional wedge shape but is much smaller and lighter due to eliminating unnecessary and non-load-bearing toe portions of the wedge shape.

Additionally, conventional wheel chocks may have pointed or peaked top ends that are susceptible to being sheared off or bent into non-load-bearing shapes (or in relatively weak load-bearing shapes (e.g., under extension loads instead of compression loads)) by large wheel loads. A modified wedge shape of the present disclosure can include a top surface that is substantially flat compared to a conventional wedge shape. The wheel can be configured to deform when in contact with the chock, and the flat top surface can be configured to engage a deformed portion of the wheel in a manner that bears additional load of the wheel without breaking and without creating an unduly large pressure concentration on the tire where it deforms into contact with the top surface. Additionally, the top surface can be compression-load-bearing while the chock is in chocking position so that it has improved durability and load capacity.

A rear surface of modified wheel chock shapes of the present disclosure (i.e., a surface facing away from a base of the wheel) can also be configured to provide high load capacity while minimizing or eliminating unnecessary size and weight. To this end, the rear surface can be at least partially horizontally angled (i.e., not completely vertical and at least partially tilted toward the center of the wheel) to a position where the rear surface is a load-bearing member of the chock that supports a portion of the distributed weight of the wheel while the chock is loaded. In some embodiments, the rear surface can be configured to extend up to the outer surface of the wheel while the chock is in chocking position and the wheel is deformed over the top surface.

Another aspect of the present disclosure relates to methods for manufacturing lightweight wheel chocks. In one embodiment, a wheel chock is built using a substantially three-phase process, wherein an exterior shell is rotationally molded or blow-molded from a high strength polymer (e.g., high-density polyethylene), then the shell is placed within a form jig, and the interior cavity of the shell is filled with a lightweight rigid or semi-rigid foam (e.g., high-density polyurethane foam). A handle, hanging bracket tube, and grip pads can be attached to the shell as part of a final assembly phase. Using this method, the manufacturing time, materials, and related costs can be reduced while still providing a durable and high-performance wheel chock for industrial applications.

The present description provides examples, and is not limiting of the scope, applicability, or configuration set forth in the claims. Thus, it will be understood that changes may be made in the function and arrangement of elements discussed without departing from the spirit and scope of the disclosure, and various embodiments may omit, substitute, or add other procedures or components as appropriate. For instance, the methods described may be performed in an order different from that described, and various steps may be added, omitted, or combined. Also, features described with respect to certain embodiments may be combined in other embodiments.

Figure 2:
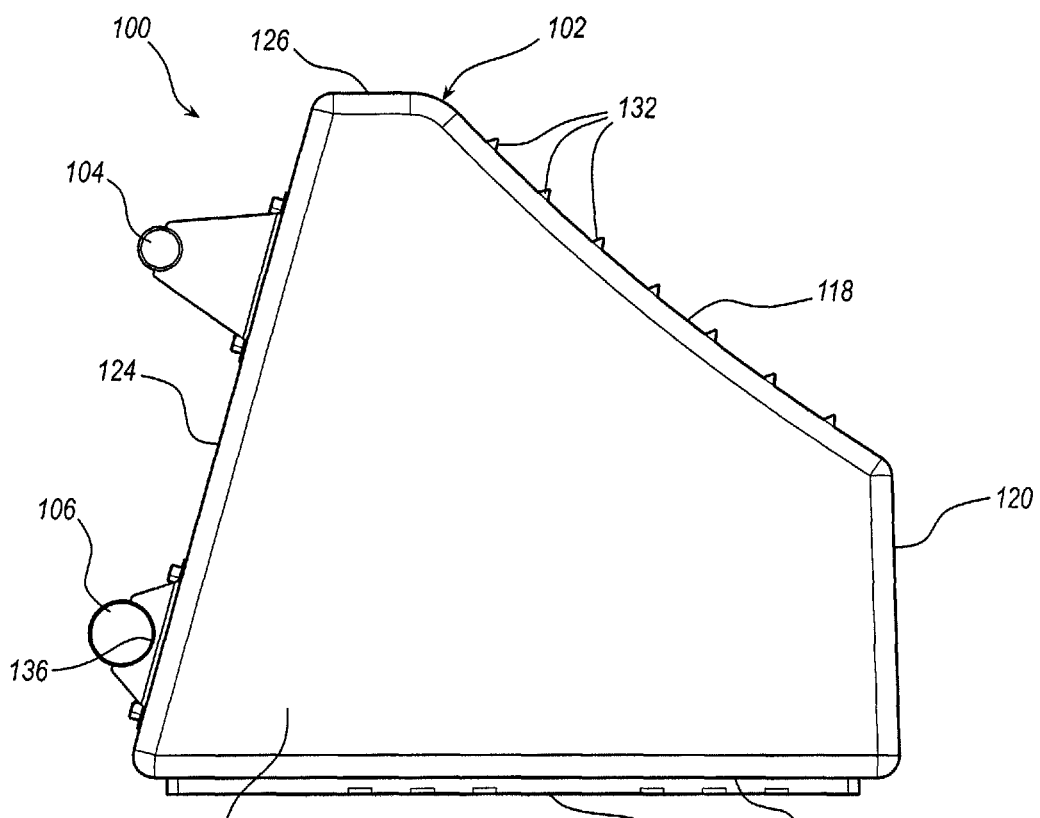
FIG. 2 is a left side view of the wheel chock of FIG. 1.
Figure 2A:
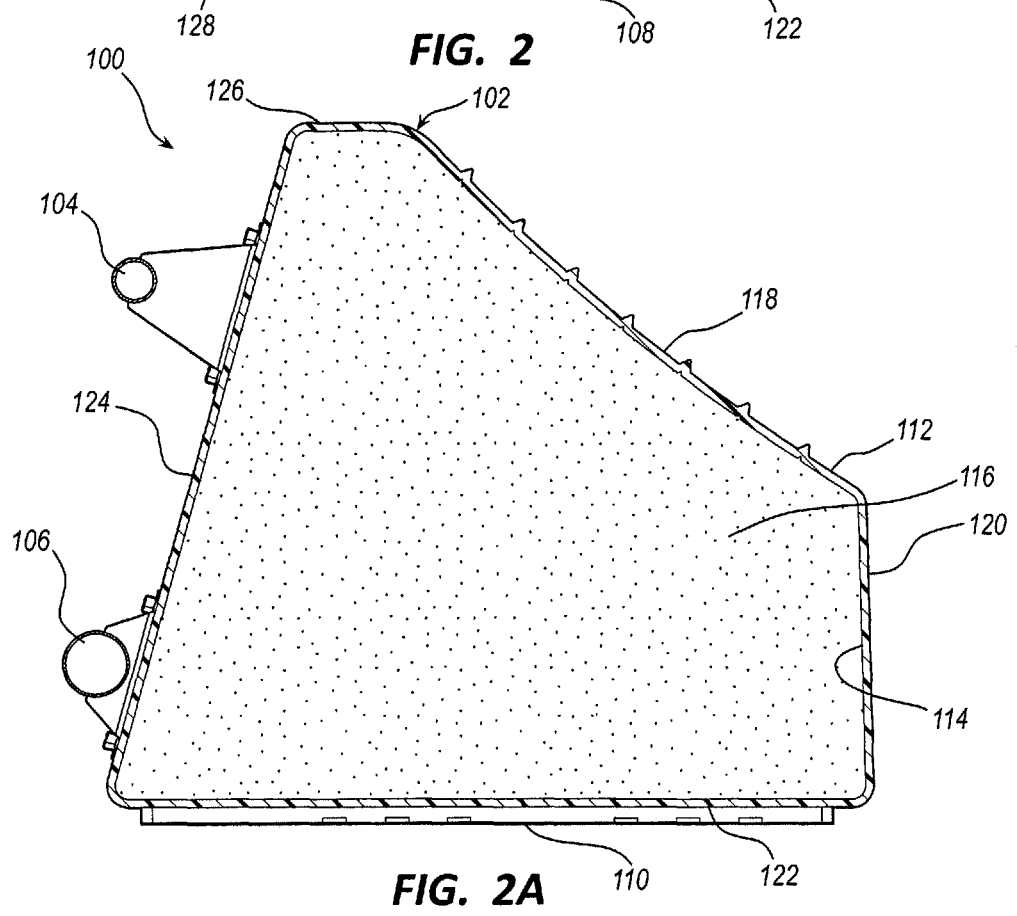
FIG. 2A is a side section view taken through section lines 2A-2A in FIG. 3.
Figure 3:
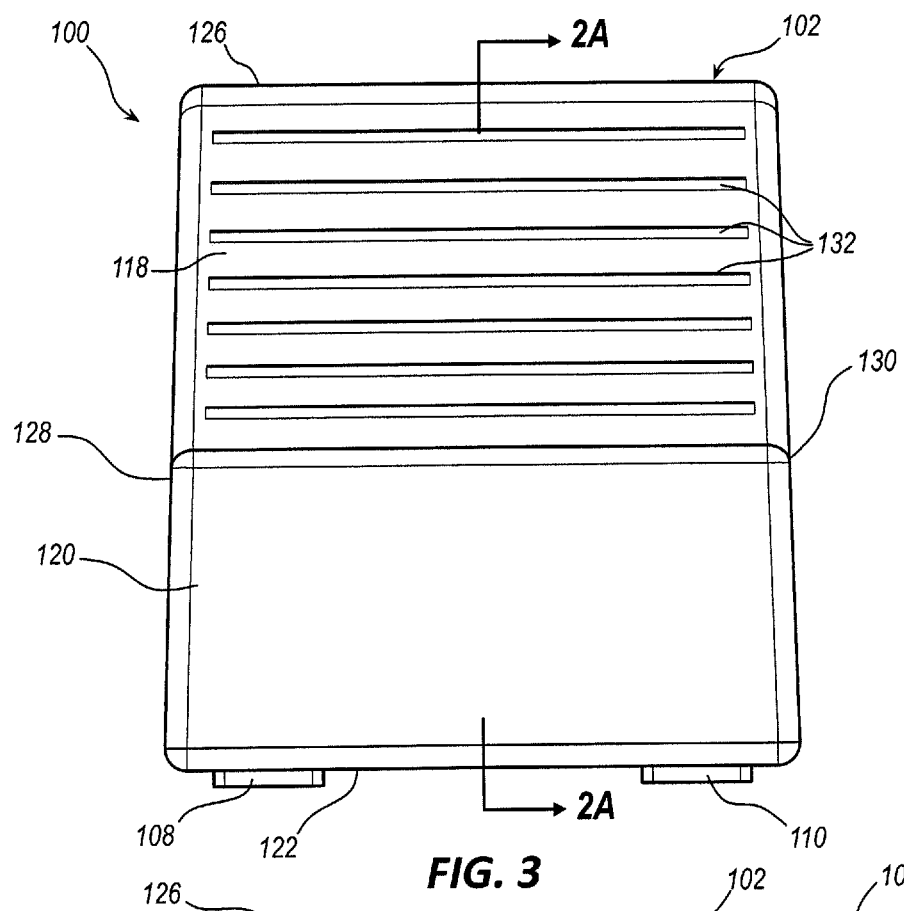
FIG. 3 is a front view of the wheel chock of FIG. 1.
Figure 4:
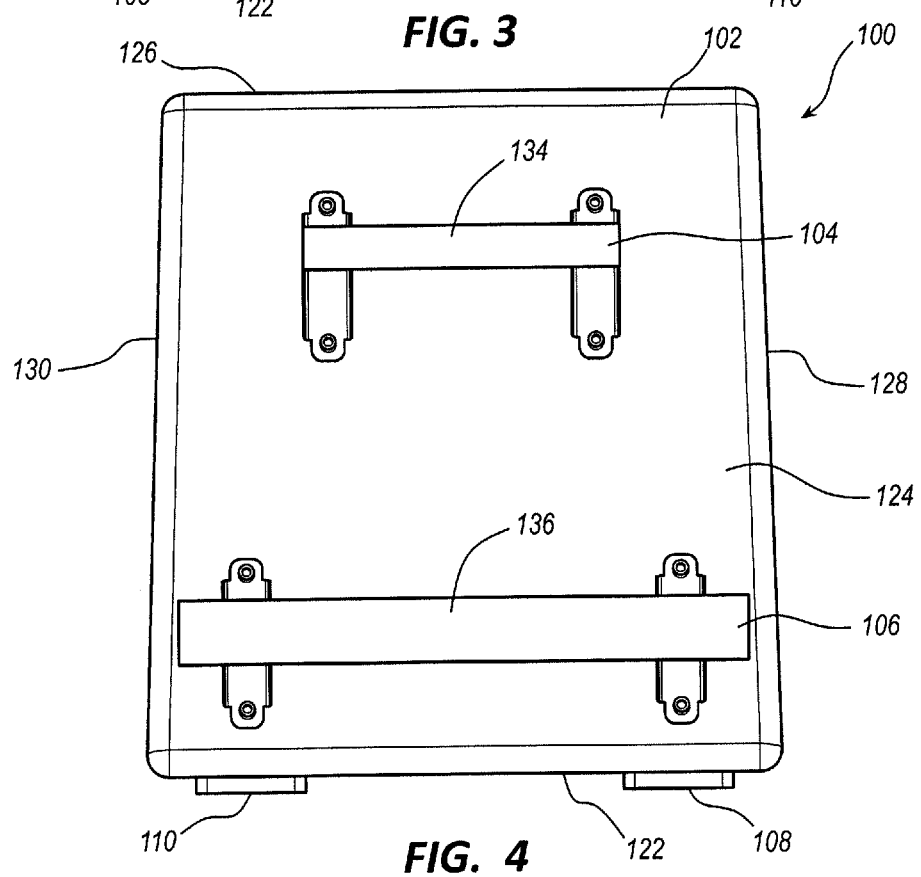
FIG. 4 is a rear view of the wheel chock of FIG. 1.
Figure 5:
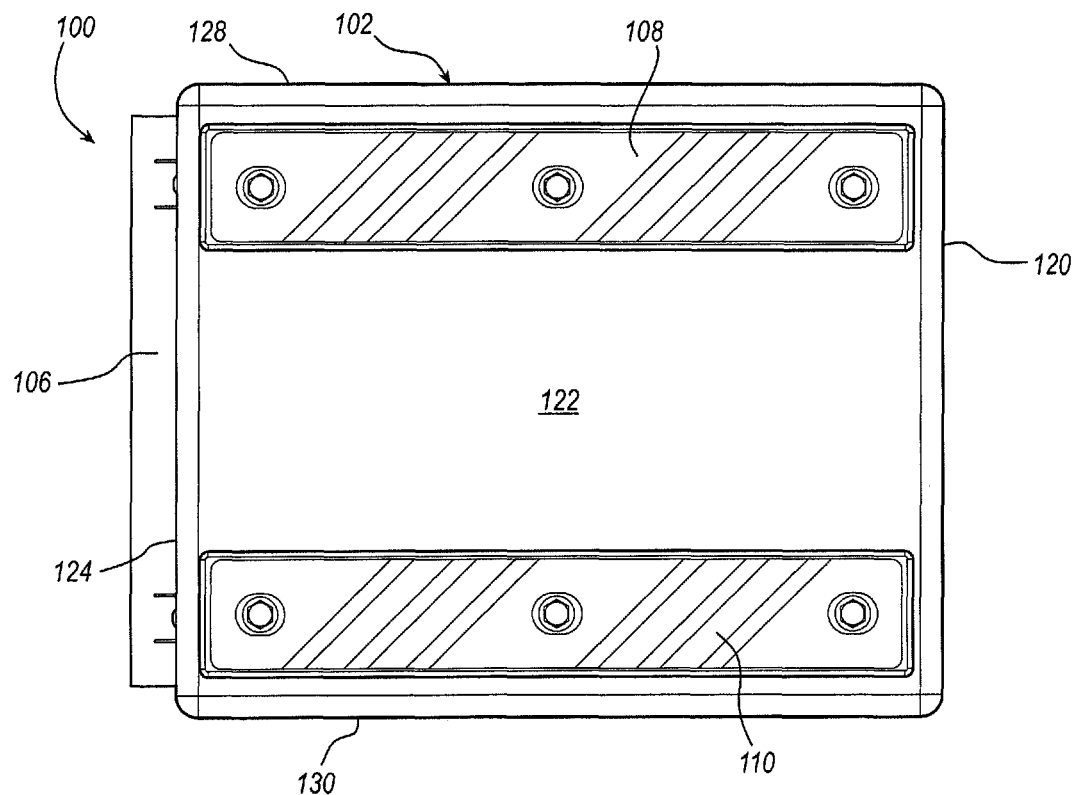
FIG. 5 is a bottom view of the wheel chock of FIG. 1.
Figure 6:
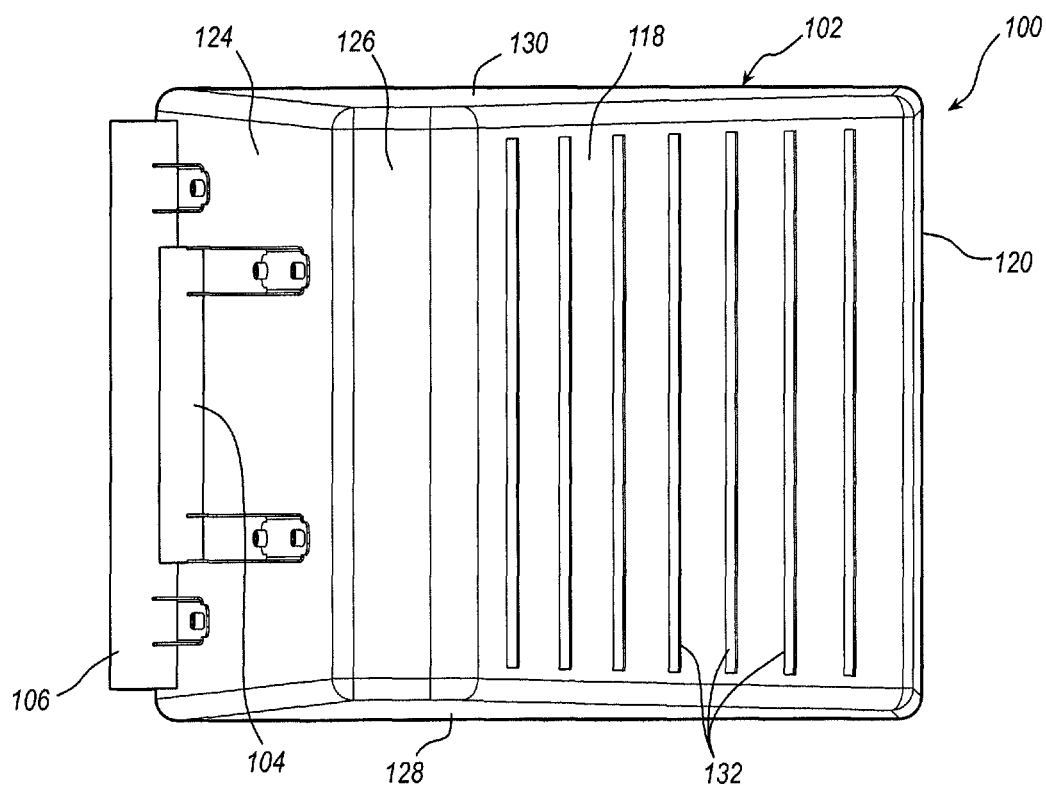
FIG. 6 is a top view of the wheel chock of FIG. 1.

Referring now to the figures in detail, FIGS. 1-6 are various views of a wheel chock 100 of the present disclosure. FIG. 1 is a perspective view of the wheel chock 100, FIG. 2 is a left side view, FIG. 3 is a front view, FIG. 4 is a rear view, FIG. 5 is a bottom view, and FIG. 6 is a top view. FIG. 2A is a side section view as taken through section lines 2A-2A in FIG. 3.

The wheel chock 100 can comprise a body 102 defining the main shape and size of the chock 100. A handle 104 (see FIGS. 2 and 4), bracket 106 (see FIGS. 2 and 4), and base pads 108, 110 (see FIGS. 2 and 5) can optionally be attached to, or a part of, the body 102. As shown in FIG. 2A, the body 102 can comprise a shell 112 having an inner cavity 114 and a core 116 that fills the inner cavity 114.

The body 102 can have a modified wedge shape with a wedging wall 118, a toe or front wall 120, a base wall 122, a back or rear wall 124, a top wall 126, and two side walls 128, 130. These walls 118, 120, 122, 124, 126, 128, 130 can adjoin each other in the manner shown in FIGS. 1-6 and can form a continuous, fluid-tight, sealed, and rigid outer surface of the shell 112. The perimeter of the vertical cross-section of the body 102 through walls 118, 120, 122, 124, and 126 can form an irregular pentagonal shape.

The wedging wall 118 can be substantially sloped relative to a vertical direction and can include curvature configured to substantially follow or match the curvature of an outer surface of a wheel. See also FIG. 7. In some embodiments, the wedging wall 118 can be flat and extend in a diagonal/sloped orientation that faces the wheel. In some cases, the wedging wall 118 can comprise a serrated or undulating form that, as a whole, follows a curved or sloped direction similar to that shown in FIG. 2. The top end of the wedging wall 118 can be positioned over a rear half of the base wall 122, and the bottom end of the wedging wall 118 can be positioned over the front wall 120 at the front-most part of the body 102 (i.e., above the front half of the base wall 122). The wedging wall 118 can also comprise a plurality of protrusions 132 (e.g., bumps, spikes, or ridges) configured to engage and increase the grip of the wedging wall 118 as it contacts a wheel.

Figure 7:
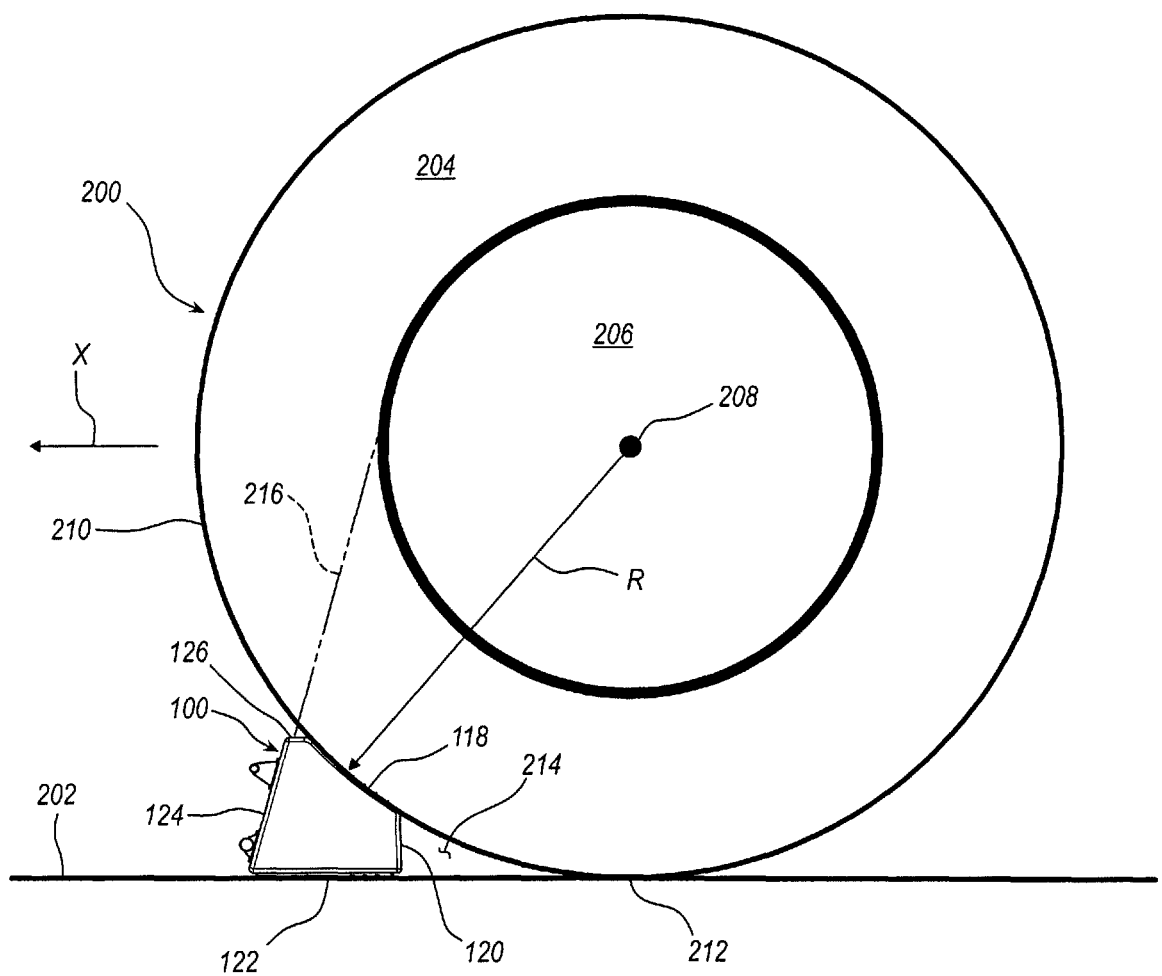
FIG. 7 is a diagrammatic side view of a wheel chock in a chocking position next to a wheel.

FIG. 7 shows a side view of an embodiment of the chock 100 positioned next to a wheel 200 on a ground surface 202. The chock 100 in this position can be referred to as being in a chocking position, a wedging position, or a wheel retention position, wherein it is pressed firmly against the outer surface of the wheel 200 and against the ground surface 202 below it. The wheel 200 can comprise a tire 204 and a hub 206 or rim configured to rotate about an axis of rotation 208 (e.g., at an axle or center of gravity of the wheel 200). In this view, the chock 100 abuts an outer surface 210 of the tire 204. The wheel 200 is prevented from moving in direction X due to frictional interference between the wedging wall 118 and the outer surface 210.

Referring again to FIGS. 1-6, the front wall 120 can be substantially vertically oriented and can extend downward from the front end of the wedging wall 118. In some embodiments, the front wall 120 is slightly non-vertical to improve demolding the shell 112. For example, the front wall 120 can be oriented at about 88 degrees relative to a horizontal direction or at about 88 degrees relative to the base wall 122. The front wall 120 can have a height proportional to the size of the wheel that the chock 100 is intended to immobilize. For example, for a wheel having a diameter of about 14 feet (i.e., about 168 inches), the front wall 120 can have a height of about 6.5 to about 7.5 inches (i.e., about 4 percent of the diameter of the wheel). In some embodiments, the front wall 120 can have a height proportional to the radius of the curvature of the wedging wall 118. For instance, with a wedging wall 118 having a major radius of 7 feet (i.e., 84 inches; corresponding to a wheel having a 14-foot diameter), the front wall 120 can have a height of about 6.5 to about 7.5 inches (i.e., about 8 percent of the major radius of the wedging wall 118).

The height of the front wall 120 can define how much space between the wheel 200 and the ground surface 202 is open or empty when the chock 100 is positioned against the wheel. As shown in FIG. 7, the front wall 120 is spaced horizontally away from a base 212 of the wheel 200, wherein the base 212 is defined as the part of the wheel 200 in contact with the ground surface 202. The empty space 214 is bounded by the outer surface 210 of the wheel 200, the front wall 120, and the ground surface 202. The empty space 214 can remain empty because horizontal forces applied to the chock 100 (i.e., parallel to direction X) are insufficient to rotate or push the chock 100 away from the outer surface 210 due to friction between the outer surface 210 and the wedging wall 118 and friction between the base pads 108, 110 and base wall 122 and the ground surface 202 generated by downward forces applied by the wheel 200 to the chock 100. The forces against the chock 100 may be insufficient, in part, due to the center of gravity of the wheel 200 (e.g., located at the axis of rotation 208) being horizontally spaced away from, and not vertically aligned with, the chock 100, as shown in FIG. 7.

For large wheels, e.g., wheels having a diameter greater than about 12 feet, a wheel chock 100 may not be subjected to significant horizontal loading at the front wall 120, so the front wall 120 does not need to contact the wheel. Furthermore, a toe portion (i.e., an extension of the body 102 in a frontal direction from the front wall 120 further underneath the wheel into the empty space 214) may not be necessary to constrain the wheel because the wheel 200 would not apply a load to that portion of the chock 100.

The base wall 122 can be substantially horizontally oriented and configured to be parallel to a ground surface 202 when the chock 100 is in use. See FIG. 7. The base wall 122 can have a substantially square or rectangular shape profile that is at least as wide as the top wall 126 and wedging wall 118 in order to enhance stability and to increase the area of surface contact between the chock 100 and the width of the wheel being retained. The base wall 122 can be attached to the base pads 108, 110 to improve the durability of the base of the chock 100 and to increase friction between the bottom of the chock 100 and the ground surface 202. The base pads 108, 110 can therefore comprise resilient and high-friction material (e.g., rubber, silicone, cork, thermoplastic polyurethane (TPU), similar materials, and combinations thereof). The base pads 108, 110 can be attached to the base wall 122 using fasteners (e.g., bolts, screws, or rivets), adhesives, interlocking parts, comolding, insert molding, or other attachment or manufacturing techniques known in the art.

The back or rear wall 124 can extend upward from the base wall 122 and can support the handle 104 and bracket 106. The handle 104 and bracket 106 can be attached to the rear wall 124 using fasteners, adhesives, interlocking parts, comolding, insert molding, or other attachment or manufacturing techniques known in the art. The handle 104 can have a grip portion 134 (see FIG. 4) configured to be grasped by at least one hand of a user. In some cases, the grip portion 134 can have a width greater than or equal to the width of four fingers of a typical hand of an adult user. Accordingly, the user can grasp the handle 104 using their hand to lift and move the chock 100. The bracket 106 can be used as a secondary handle or grip for lifting the chock 100. In some cases, the bracket 106 can be configured to receive a rod into its tube 136 (see FIGS. 2 and 4), and the rod can support the weight of the chock 100 while the chock 100 is stored on the rod. Alternatively, a hook or other connector can be used to hold or store the chock 100 by engaging (e.g., wrapping at least partially around) the bracket 106.

The rear wall 124 can also be oriented at a non-vertical angle relative to the ground surface or relative to the base wall 122. In some embodiments, the rear wall 124 can be angled at about a 75-degree angle relative to the base wall 122. The angle at which the rear wall 124 is oriented can be based on the curvature of the wedging wall 118 and based on the amount of anticipated deformation of the wheel 200 when it contacts the chock 100 at the top wall 126. For example, the radius R of the wheel 200 (see FIG. 7) can be substantially equal to the radius of the wedging wall 118. In one embodiment, the angular orientation of the rear wall 124 can cause the rear wall 124 to be coplanar with or parallel to a plane tangent to a solid portion (e.g., a rim or hub 206) of the wheel 200 that the chock 100 is intended to retain. For example, line 216 extends parallel to rear wall 124 and tangent to hub 206 in FIG. 7. In some cases, the line 216 can be configured to be perpendicular to an outer surface of the wheel 200 when it has deformed (e.g., at bulge 300) to maximize the load-bearing capacity of the rear wall 124. See FIG. 8. In some embodiments, the rear wall 124 can have a height that is about twice as large as the height of the front wall 120. In one embodiment, the height of the rear wall 124 is about 15 to about 15.25 inches.

The top wall 126 of the body 102 can be substantially horizontally oriented or parallel to the base wall 122. The top wall 126 can be a portion of the chock 100 configured to bear information about the chock 100, such as branding, model information, or other identifying information about the chock 100 that will be easily referenced from the viewpoint of a user standing near the chock 100 with the base wall 122 on the ground. The top wall 126 can also space the wedging wall 118 away from the rear wall 124. Thus, rather than the wedging wall 118 extending to the rear wall 124 at an acute angle and forming a sharp point at the top of the chock 100, the top wall 126 cuts off and blunts the top of the chock 100. This blunt top surface ensures that lateral force applied to the wedging wall 118 (i.e., along direction X) is not able to break or overly deform the top of the wedging wall 118.

Figure 8:
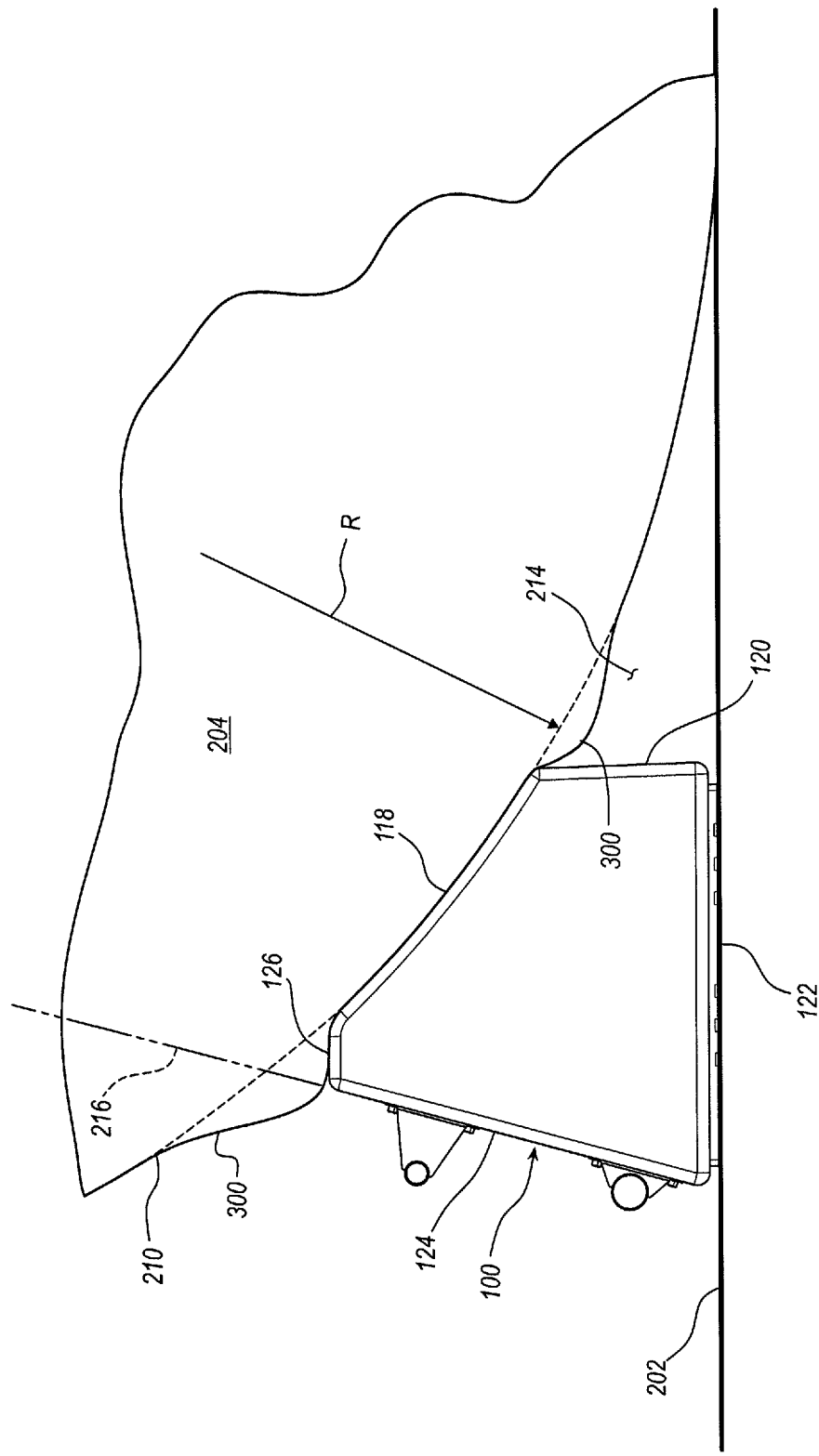
FIG. 8 is a detailed side view of the wheel chock of FIG. 7 supporting a wheel that is applying pressure to the wheel chock.

In some embodiments, the top wall 126 can be a load-bearing structure configured to contact a deformed portion of the wheel 200 as it is being retained by the chock 100. As shown in FIG. 8, the wheel 200 can have deformation at its outer surface 210 caused by pressure between the tire 204 and the wheel chock 100. The deformation can comprise a bulge 300 at one or both ends of the wedging wall 118, wherein a bulge 300 has an outer surface that extends radially outward from the outer surface 210 of the tire 204. In other words, the tire 204 can have an increased radius (i.e., greater than radius R) at a bulge 300. The bulge 300 can extend into contact with the top wall 126 and can be supported at least in part by the top wall 126. Accordingly, pressure from the tire can be applied to the chock 100 simultaneously at the wedging wall 118 and at the top wall 126. In some embodiments, the tire 204 can deform radially inward where it contacts the wedging wall 118, thereby forming a depression in the outer surface 210 rather than a bulge 300. In that case, the sides of the depression can engage the top wall 126 and/or front wall 120 of the chock 100 and can apply pressure to the chock 100 in that manner. The wedging wall 118 and top wall 126 can therefore both receive pressure from the tire 204 and distribute that pressure through the other structures of the body 102, including the core 116, rear wall 124, front wall 120, base wall 122, and side walls 128, 130. Accordingly, all of the walls around the vertical perimeter of the body 102 (e.g., a vertical perimeter in a plane that is perpendicular to the axis of rotation of the wheel 200), and the body 102 as a whole, can be load-bearing when the chock 100 is retaining the wheel 200.

The side walls 128, 130 can cover the left and right sides of the body 102 and can seal those sides against ingress of particles and fluids. The side walls 128, 130 can also structurally connect the other walls 118, 120, 122, 124, 126 to each other and can distribute load applied to the wedging wall 118 and top wall 126 (and potentially also the front wall 120) to the rear wall 124 and base wall 122 (and potentially also the front wall 120). The side walls 128, 130 can be oriented entirely vertically or can be slightly pitched inward toward the top wall 126, as shown in FIGS. 3, 4, and 6. The slight narrowing of the side walls 128, 130 can improve stability of the chock 100 against horizontally-applied forces against the side walls 128, 130 and can simplify and ease demolding the shell 112.

The shell 112 can comprise a rigid material configured to hold the general overall dimensions of the wheel chock 100 while retaining a wheel. In some embodiments, the shell 112 can comprise a polymer or metal material having high stiffness and low density. The material used in the shell 112 can also be selected for its durability, water resistance, and other related properties. In some cases, the shell 112 can comprise high density polyethylene (HDPE). The shell 112 can have a thickness that is substantially equal around the walls 118, 120, 122, 124, 126, 128, 130 of the body 102. See FIG. 2A. For example, the shell 112 can have a thickness of about 0.25 inches at each of the walls. The shell 112 can therefore have an inner cavity 114 or inner chamber that has its boundaries on all sides defined at a single distance from the outer surfaces of the body 102.

The inner cavity 114 can be filled with the core 116 to provide structural stability to the shell 112. The core 116 can include a relatively low-density, rigid or semi-rigid, and low-compressibility material configured to substantially retain its size under compressive pressure. Thus, pressure on the core 116, as applied through the walls 118, 120, 122, 124, 126, 128, 130 of the body 102, can be distributed through the core 116 without collapsing or otherwise heavily deforming the shell 112. In some embodiments, the core 116 can include a rigid or semi-rigid foam material that fills the inner cavity 114. For example, the foam material can comprise high-density polyurethane (HDPE) foam. The material used in the core 116 can have less density than the material used in the shell 112. For example, the core 116 can comprise a polyurethane foam and the shell 112 can comprise a solid polyurethane layer. In this manner, the shell 112 can be used to provide resistance to denting, punctures, particle or fluid ingress, and other external wear problems, and the core 116 can be used to provide structural stability without unnecessarily increasing the overall weight of the body 102.

In some embodiments, the core 116 can fill the entire inner cavity 114 such that there are no significant empty (i.e., only-air-filled) internal voids or spaces within the shell 112 that are not filled by the material of the core 116. In this case, the shell 112 and core 116 can collectively act as a rigid body. The shell 112 can be relatively lightweight due to its thinness and rigid but light material composition, and the core 116 can also be relatively light weight due to its material composition. Accordingly, the chock 100 can be configured to retain a large vehicle wheel or tire, such as a vehicle having a weight up to and even more than 650 tons and a wheel having about a 14-foot diameter, even on a grade of about 8 to about 10 degrees, while the chock 100 itself weighs less than 30 pounds. In some embodiments, the chock 100, including the body 102, handle 104, bracket 106, and base pads 108, 110, can collectively weigh between about 24 pounds to about 28 pounds. In one case, the chock 100 can weigh between about 25 pounds to about 27 pounds. This low weight allows the chock 100 to be moved more easily by a single person, thereby making the chock 100 more convenient and less expensive to use in the field.

A wheel chock 100 can be constructed using various molding techniques such as, for example, rotational molding or blow-molding. The shape of the shell 112 can be designed to be made using such molding techniques, including outer surface draft angles and shapes that are configured to be easily and quickly made in a mold. In embodiments where a blow-molding process is used, the outer surfaces of the shell 112 can be simple and smooth, lacking sharp edges or fine detail in order to improve outer surface suitability for blow-molding. Using blow-molding can also decrease manufacturing time by up to a factor of 10 as compared to using rotational molding.

In one embodiment, a hollow shell can be formed using a molding process and can then be placed within a jig such as, for example, a steel form jig. While in the jig, the interior cavity of the shell can be filled with the light weight rigid or semi rigid foam. The shell can then be removed from the jig, and the handle, hanging bracket tube, and base grip pads can be attached to the body. In some embodiments, because the shell is formed with a constant thickness on all walls, the handle and other attached parts can be attached to the shell rather than being molded into or part of the shell.

Various inventions have been described herein with reference to certain specific embodiments and examples. However, they will be recognized by those skilled in the art that many variations are possible without departing from the scope and spirit of the inventions disclosed herein, in that those inventions set forth in the claims below are intended to cover all variations and modifications of the inventions disclosed without departing from the spirit of the inventions. The terms "including:" and "having" come as used in the specification and claims shall have the same meaning as the term "comprising."

What is claimed is:

1. A wheel chock, comprising:
   a portable shell defining an inner cavity, the portable shell having a wedging wall configured to contact a wheel having a hub, a front wall to face a base of the wheel, a rear wall to face away from the base of the wheel, and a base wall for positioning toward a ground surface; and
   a rigid filling within the inner cavity of the portable shell;
   wherein the wedging wall distributes a load through the front wall and through the rear wall when chocking the wheel against the wedging wall;
   wherein the base wall comprises a base pad attached to the base wall, the base pad comprising a ground-engagement surface protruding from the base wall;
   wherein the rear wall comprises an angular orientation that is non-parallel to the front wall;
   wherein the rear wall comprises a handle and a bracket, the bracket sized and shaped to receive a storage connector;
   wherein the rear wall comprises a chocking position that aligns with a plane tangent to the hub of the wheel; and
   wherein the wedging wall comprises a plurality of protrusions engageable with the wheel when chocking the wheel against the wedging wall.

2. The wheel chock of claim 1, wherein the wheel chock is configured to chock a wheel having a diameter greater than about 12 feet.

3. The wheel chock of claim 1, wherein the front wall is substantially vertically-oriented.

4. The wheel chock of claim 1, wherein the front wall is spaced away from the base of the wheel.

5. The wheel chock of claim 1, wherein the wedging wall comprises a top wall that is substantially horizontally-oriented and an angled wall positioned between the top wall and the front wall.

6. The wheel chock of claim 5, wherein the top wall is configured to contact a deformed portion of the wheel.

7. The wheel chock of claim 1, wherein the rear wall is partially horizontally oriented.

8. The wheel chock of claim 7, wherein the rear wall adjoins a bottom wall of the portable shell.

9. The wheel chock of claim 1, wherein an entirety of the portable shell and the rigid filling are load-bearing when engaging a wheel.

10. A wheel chock, comprising:
    a portable shell defining an inner cavity;
    a core filling the inner cavity of the portable shell;
    wherein the portable shell and the core are configured to prevent rotation of a wheel when wedged between an outer surface of the wheel and a ground surface;
    wherein the portable shell and the core comprise a combined weight of up to 30 pounds;
    wherein the portable shell comprises a base pad with a ground-engagement surface protruding from the portable shell;
    wherein the portable shell comprises a handle and a bracket, the bracket sized and shaped to receive a storage connector;
    wherein a portion of the portable shell comprises a chocking position that aligns with a plane tangent to a hub of the wheel; and
    wherein another portion of the portable shell comprises a plurality of protrusions engageable with the wheel.

11. The wheel chock of claim 10, wherein the portable shell comprises a first rigid material having a first density and the core comprises a second rigid material having a second density, the second density being less than the first density.

12. The wheel chock of claim 10, wherein the core comprises a rigid foam.

13. The wheel chock of claim 10, wherein the portable shell comprises a wedging wall configured to contact the wheel having a base, a front wall to face the base of the wheel, a rear wall to face away from the base of the wheel, a base wall oriented toward the ground surface, and a top wall positioned between the wedging wall and the rear wall.

14. The wheel chock of claim 13, wherein the wedging wall, the front wall, the rear wall, the base wall, and the top wall comprise a vertical cross-section forming an irregular pentagonal shape wherein the shell and the core are configured to prevent rotation on a ground surface having a grade of up to 10 percent.

15. The wheel chock of claim 10, wherein the portable shell has a substantially constant wall thickness.

16. A wheel chock, comprising:
    a portable shell having a base wall, a toe wall, a contact wall, a top wall, and a back wall, the portable shell having an inner chamber;
    a core material within the inner chamber of the portable shell;

wherein the base wall comprises a base pad attached to the base wall, the base pad comprising a ground-engagement surface protruding from the base wall;

wherein the contact wall comprises a curved surface having a radius, the radius having a center point, the toe wall having a height greater than or equal to about eight percent of the radius of the curved surface;

wherein the contact wall comprises a plurality of protrusions engageable with a wheel when chocking the wheel against the contact wall;

wherein the back wall comprises a handle and a bracket, the bracket sized and shaped to receive a storage connector; and wherein the back wall comprises a chocking position that aligns with a plane tangent to a hub of a wheel.

17. The wheel chock of claim 16, wherein the toe wall is vertically oriented.

18. The wheel chock of claim 16, wherein the toe wall adjoins the base wall.

19. The wheel chock of claim 16, wherein the back wall is about twice as long as the toe wall.

20. The wheel chock of claim 16, wherein the portable shell and the core material have a combined weight less than about 30 pounds.

* * * * *